United States Patent
As et al.

(10) Patent No.: US 12,400,126 B2
(45) Date of Patent: Aug. 26, 2025

(54) PREDICTIVE CLASSIFICATION MODEL FOR AUTO-POPULATION OF TEXT BLOCK TEMPLATES INTO AN APPLICATION

(71) Applicant: CERNER INNOVATION, INC., Kansas City, KS (US)

(72) Inventors: Sheshanth As, Karnataka (IN); Ashok Biradar, Karnataka (IN); Kiran Chornoor, Bangalore (IN)

(73) Assignee: Cerner Innovation, Inc., Kansas City, MO (US)

( * ) Notice: Subject to any disclaimer, the term of this patent is extended or adjusted under 35 U.S.C. 154(b) by 1032 days.

(21) Appl. No.: 17/399,217

(22) Filed: Aug. 11, 2021

(65) Prior Publication Data
US 2023/0053204 A1 Feb. 16, 2023

(51) Int. Cl.
*G06N 5/01* (2023.01)
*G06N 20/20* (2019.01)

(52) U.S. Cl.
CPC .............. *G06N 5/01* (2023.01); *G06N 20/20* (2019.01)

(58) Field of Classification Search
CPC ............ G06N 5/01; G06N 20/20; G06N 5/04; G06N 3/02; G06N 3/042; G06N 3/045; G06N 3/047; G06F 40/186; G06F 3/0484; G06F 2111/20; G06F 3/0481; G06F 9/451; G06F 8/38; G06F 3/048; G06Q 10/103; G06Q 30/04; G06Q 30/0643
See application file for complete search history.

(56) References Cited

U.S. PATENT DOCUMENTS

| | | | |
|---|---|---|---|
| 8,473,307 B2* | 6/2013 | Dove | G06Q 10/00 705/2 |
| 9,069,746 B2 | 6/2015 | Ash et al. | |
| 9,916,420 B2 | 3/2018 | Cardoza et al. | |
| 10,199,124 B2 | 2/2019 | Casella Dos Santos | |
| 2009/0326985 A1 | 12/2009 | Martin et al. | |
| 2015/0019254 A1* | 1/2015 | Ibikunle | G06F 21/6245 705/3 |
| 2020/0303072 A1* | 9/2020 | Drokin | G16H 10/60 |
| 2021/0174800 A1* | 6/2021 | Srinivasan | G06F 3/167 |

* cited by examiner

*Primary Examiner* — Daniel T Pellett
(74) *Attorney, Agent, or Firm* — Invoke

(57) ABSTRACT

Methods, systems, and computer-readable media are disclosed herein that provide for a machine learning classification model that is trained with historical data and which, by ingesting minimal test data from a particular instance of the application, predictively determines an existing text block that is most relevant for that particular instance of the application. When determined by the model, a particular template is auto-populated into a free text input box within the application for presentation in a graphical user interface.

20 Claims, 7 Drawing Sheets

400

PATIENT NAME: ANDERSON, ANDY

AGE: 10 YR(S)

ASSESSMENT AND PLAN:

HEALTHY ☐ YO CHILD
- CBC ORDERED. NO INDICATION FOR DM SCREENING.
- CHECK LIPID PANEL BETWEEN 9-11 YO, REPEAT 18-21 YO.
- SCREEN FOR DEPRESSION _ >12 YO.
- FOLLOW IN ONE YEAR, OR SOONER PRN.

REVIEW OF SYSTEM:

- DIET: NO CONCEERNS.
- FAST FOOD, SODA, JUICE INTAKE: _
- CALCIUM INTAKE: _
- DENTAL: + BRUSHES TEETH. SEES THE DENTIST REGULARLY.
- SLEEP CONCERNS (DURATION, SNORING, BEDTIME): NONE.

HISTORY OF PRESENT ILLNESS:

_ HERE FOR WELL CHILD CHECK. NO PARENTAL OR PATIENT CONCERNS AT THIS TIME.

| SAVE AS PRE-POPULATED NOTE | CREATE NEW NOTE | SAVE |

NOTE: ☐ IS A PLACEHOLDER FOR CLINICIANS TO FILL THE PATIENT DATA

*FIG. 4.*

PREDICTIVE CLASSIFICATION MODEL FOR AUTO-POPULATION OF TEXT BLOCK TEMPLATES INTO AN APPLICATION

TECHNICAL FIELD

The present subject matter relates, in general, to machine learning and, specifically, to predictive classification modeling.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods, systems, and computer-readable media for a predictive classification model that auto-populates text block template(s) into an application. The present disclosure provides a machine learning non-linear classification model that, when trained with historical data, ingests test data to predict a text block template that is a best match to the test data. The text block template is further auto-populated into an application without any need for additional information.

In one aspect, a computerized method is provided. In the method, historical data is received from a database, and a machine learning non-linear classification model is trained using the historical data and a predefined hyperparameter to constrain the training. An indication is received that an instance of an application is instantiated, and test data is received from the application. Further, the trained machine learning non-linear classification model that has been trained automatically identifies a particular template that is a best match to the test data. The particular template is auto-populated into a free text input box within the application for presentation in a graphical user interface.

In another aspect of the present disclosure, one more non-transitory computer-readable media having computer-executable instructions embodied thereon are provided that, when executed, perform a method. In aspects, historical data is received from a database. A machine learning non-linear classification model is trained with the historical data and a predefined hyperparameter to constrain that training. When training the machine learning non-linear classification model, each template in a plurality of templates in the historical data is designated as a class. A unique class identifier is assigned to each class designated for each template in the plurality of templates. Further, the model generates a plurality of decision trees using a constraint defined by the predefined hyperparameter, when training. In a further aspect, one decision tree is generated for each class using a corresponding template. An indication is received that an instance of an application is instantiated and test data is received from the application. The machine learning non-linear classification model that is trained with the historical data, automatically identifies a particular template that is a best match to the test data. The model identifies a first decision tree that is the best match to the test data for the plurality of classes. Generally, each decision tree in the plurality of decision trees corresponds to one class in the plurality of classes, and each class in the plurality of classes corresponds to one template of the plurality of templates in the historical data. The first class that corresponds to the first decision tree is identified and associated with a unique class identifier. Using the unique class identifier that corresponds to the first class, the particular template that corresponds to the first class is identified. The particular template is then auto-populated into a free text input box within the application for presentation in, for example, a graphical user interface, because the particular template has been predicted by the machine learning non-linear classification model to be a most relevant and/or more accurate template for the test data of that instance of the application.

In yet another aspect of the present disclosure, a system is provided. The system includes a database for storing historical data, a machine learning non-linear classification model, and an application that provides test data as an input to the machine learning non-linear classification model and causes display of output from the machine learning non-linear classification model. The machine learning non-linear classification model is configured to receive the historical data from the database, where the historical data includes a plurality of templates. The machine learning non-linear classification model designates each template in the plurality of templates as a class and assigns a unique class identifier to each class designated for each template in the plurality of templates.

Further, the machine learning non-linear classification model generates a plurality of decision trees using a constraint defined by a predefined hyperparameter, wherein there is one decision tree for each class using a corresponding template. Further, an indication is received that an instance of the application is instantiated and the test data from the application is received, by the machine learning non-linear classification model. The machine learning non-linear classification model identifies a first decision tree from the plurality of decision trees that is a best match to the test data in the plurality of decision trees for a plurality of classes, wherein each decision tree in the plurality of decision trees corresponds to one class in the plurality of classes, and wherein each class in the plurality of classes corresponds to one template of the plurality of templates in the historical data. The machine learning non-linear classification model identifies a first class that corresponds to the first decision tree, wherein the first class is associated with the unique class identifier. The machine learning non-linear classification model uses the unique class identifier that corresponds to the first class to retrieve a particular template that corresponds to the first class to be auto-populated. The machine learning non-linear classification model then auto-populates the particular template into a free text input box within the application for presentation in a graphical user interface.

BRIEF DESCRIPTION OF THE DRAWINGS

Embodiments are described in detail below with reference to the attached drawings figures, wherein:

FIG. 4 is an example graphical user interface that has been auto-populated with a text block template in an application in accordance with aspect(s) of the present disclosure;

DETAILED DESCRIPTION

Figure 1:
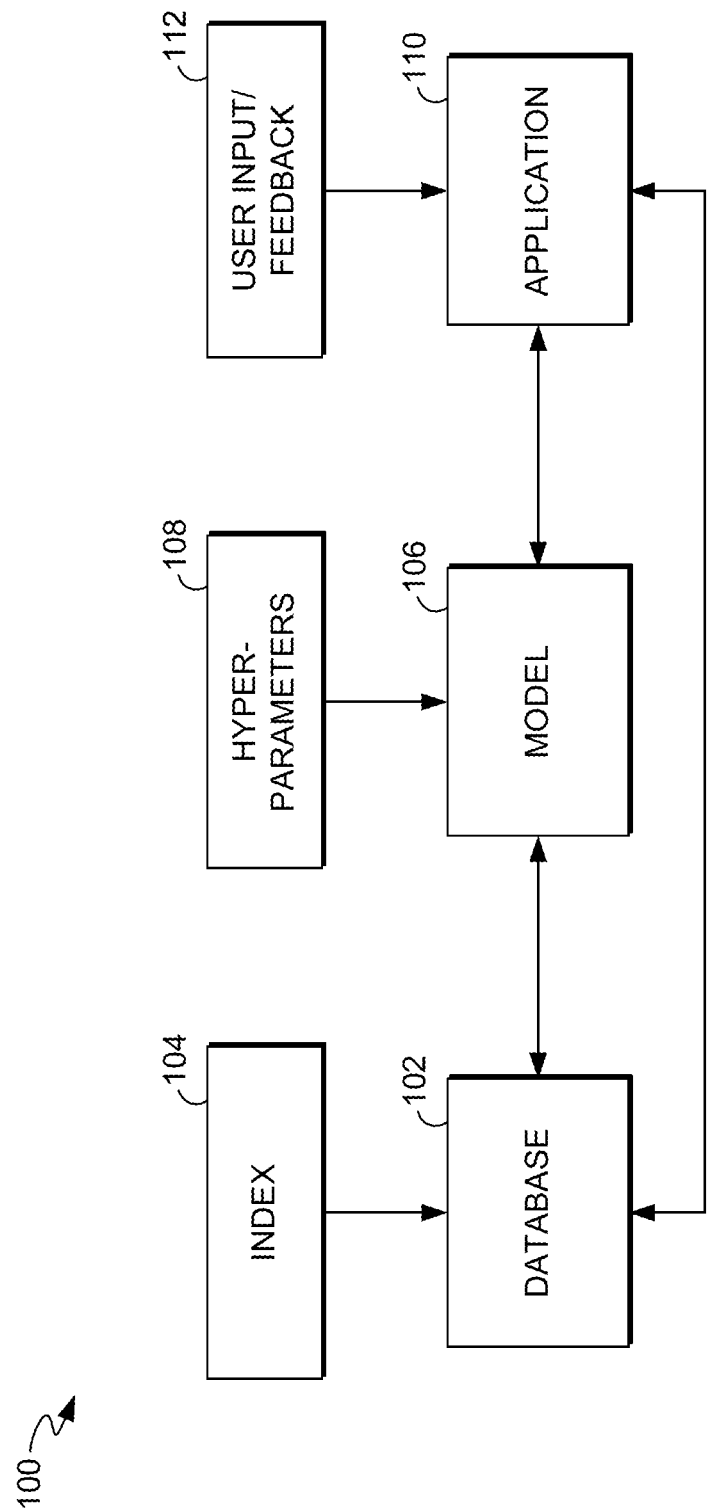
FIG. 1 is a block diagram of an example system in accordance with aspect(s) of the present disclosure.

The subject matter of the present disclosure is described with specificity herein, with help of various aspects, in order to meet the statutory requirements. However, the description is not intended to limit the scope of the present disclosure. Rather, the inventors have contemplated that the claimed subject matter might also be embodied in other ways, to include different steps or combinations of steps similar to the ones described herein, in conjunction with other present or future technologies. Terms used herein should not be interpreted as implying any particular order among or between various steps described herein unless and except when the order of individual steps is explicitly described. As such, although the terms "step" and/or "block" may be used herein to connote different elements of system and/or methods, the terms should not be interpreted as implying any particular order and/or dependencies among or between various components and/or steps described herein unless and except when the order of individual steps is explicitly described. The present disclosure will now be described more fully herein with reference to the accompanying drawings, which may not be drawn to scale, and which are not to be construed as limiting. The present disclosure may be embodied in different forms and should not be construed as limited to the embodiments set forth herein.

Aspects described herein provide technological solutions for interfacing with and auto-populating text blocks (i.e., templates) into free text input boxes displayed in a graphical user interface of an application. The technological solutions include a machine learning non-linear classification model that is self-trained (i.e., autonomous) with historical text block data. The machine learning non-linear classification model intelligently identifies and automatically selects the particular text block(s) to be auto-populated within the application. The technological solutions provided herein have significant improvements over existing technologies, including computerized auto text and autocomplete functions. Particularly, existing technologies require a user to create, define, and store text (i.e., a user is required to manually types text, defines an identifier for the text, and instruct a device to store the text), which can only be recalled as "auto text" when the user inputs a user-specified identifier for the particular text in order to retrieve it. For example, text is manually inserted by the user using functions, such as copy-and-paste, auto complete, or auto insertion (e.g., Microsoft® Quick Parts). As such, in existing technologies, a user is required to separately create, define, and store each different piece of text with its own identifier, and manually retrieve it via the identifier. In contrast, the technological solutions described hereinafter, in detail, include the machine learning non-linear classification model that does not require a user to separately create, define, and store each different piece of text, and does not require a user to create identifiers for each specific text/text block for retrieval.

In an aspect of the present disclosure, one machine learning non-linear classification model supports multiple and varied sections for electronic documentation in an application, such as a clinical note section in an application. When a user interacts with the application, for example, by scrolling through a graphical user interface to reach a clinical note input box, the model is triggered to predict which text block template in the historical data is the most relevant or most applicable to that instance of the application for that user. The trained model ingests, for example, the patient data associated with that instance of the application, the provider data associated with that instance of the application, and/or diagnosis data associated with that instance of the application, and uses it to identify the best match to a text block template. The best match prediction is auto-populated into the clinical note input box displayed in the graphical user interface, in real time with the scrolling mentioned above. The text block template may be displayed with prompts for the user to enter information for the clinical note input box.

Definitions

As used herein, the terms "model", and "machine learning model" are used interchangeably. A machine learning model is an output generated by running a prediction algorithm(s) against ingested training data. The model (i.e., output) represents the rules, numbers, and any other algorithm-specific data structures required to make predictions. In various aspects, the model is generated using non-linear prediction algorithm(s). In some aspects, the model is generated from a classification algorithm (i.e., a tree-based ensemble model). In an aspect, the model is generated from a non-linear classification model.

The terms "text" and "text block" are used interchangeably herein. A text block refers to a plurality of alphanumeric characters arranged into, for example, words, sentences, and/or paragraphs in any human-readable language.

A "text block template" refers to a text block that is free of personal identifying information (PII), such as personal health information (PHI). The text block template may include, in addition to words, sentences, and/or paragraphs, in any human-readable language, any quantity of fields, passive prompts (e.g., a colon after which user a user can type information, a highlighted empty field), or active prompts (e.g., a blinking cursor) for a user to enter PII, in some aspects. The terms "text block template" and "template" are used interchangeably hereinafter. A text block template may capture one or more portions of clinical notes found in the historical data, in some aspects, capture through an application.

An "application" refers to a computer software program designed to carry out specific function(s) or task(s) that are generally usable by end users. For example, an application may be specific to word processing, statistical analysis, social media sites, games, electronic documentation, or the like.

As used herein, a "decision tree" refers to a type of model for classification and/or regression. A decision tree is generated using a machine learning computer algorithm, for example, that builds a tree-like structure having branches linked by nodes. Generally, a decision tree is built when the machine learning computer algorithm iteratively "asks questions" in order to partition data to form branches and leaves, based on "if A, then B" determinations for categorical data (e.g., classification). In the context of a Random Forest Model, a decision tree can utilize features when determining whether to split a node in the branch of a tree, for example, and each distinct decision tree determines whether to split a node using different features (i.e., uncorrelated trees protect against errors).

train the model, using any quantity of patient encounters, for any quantity of various patients, and for any quantity of various clinicians.

TABLE 1

| | |
|---|---|
| Patient details | Encounter type (e.g., inpatient or outpatient, purpose of the encounter such as post-surgical check-up, an annual wellness visit, laboratory blood draw) associated with a patient and/or patient demographic data (e.g., for each of plurality of patients, age, gender, race/ethnicity, language, social history) associated with a patient. |
| Provider details | Clinical rotation service (e.g., telemetry, orthopedics, pediatrics, neurology, inpatient or outpatient) associated with a provider, physician indicator (e.g., clinician name, unique identifier associated with the provider) associated with a provider. |
| Diagnosis details | Classification of clinical diagnosis, priority of diagnosis, type of diagnosis. |

A "class" refers to grouped data in the context of nonlinear classification models (e.g., data that forms a class wherein all the data of that class cannot be described mathematically using a straight line, as opposed to linear classification. For example, a Random Forest Model is a type of machine learning used to process nonlinear data, such as categorical data, wherein each decision tree produces a classifier or class prediction, and wherein the class predicted the most within the whole 'forest' by the decision trees is the output predicted class.

Overview

In particular aspects, a machine learning non-linear classification model (hereinafter referred to as "the model") interfaces with an electronic documentation application. The model automatically populates a text block template into a text input box displayed on a graphical user interface (GUI) that corresponds to the application. For example, as a user scrolls down continuously on the GUI, the text input box is presented in that portion of the GUI. The model identifies and selects the text block template that is predicted as a best match, in near real-time, for that instance of the application, based on various factors discussed hereinafter. As such, the model serves a user, interacting with the GUI of the application, the text block template that is predicted to be the most relevant text block template for that particular instance of the application. The text block template is predicted to be the most relevant block selected from among a plurality of distinct text blocks stored in a historical database, because the text block template reflects how a particular user (e.g., clinician John Doe versus clinician Jane Coe) historically documented the same or similar persons (e.g., patients) during a specific type of encounter (e.g., inpatient neurology evaluation versus inpatient post-operative encounter for orthopedics).

For accurate prediction, the model is first trained using historical data. The model can be retrained periodically, in various aspects, with additional data and/or with feedback from users of the application. The model can be trained using historical data comprised of patient details, provider details, diagnosis details, and/or any combination thereof. The historical data may be stored in a database, for example, after being captured from existing clinical notes and after machine-driven removal of PII. Table 1 (infra) provides examples of data types of the historical data that are used to train the model, using any quantity of patient encounters, for any quantity of various patients, and for any quantity of various clinicians.

Figure 3:
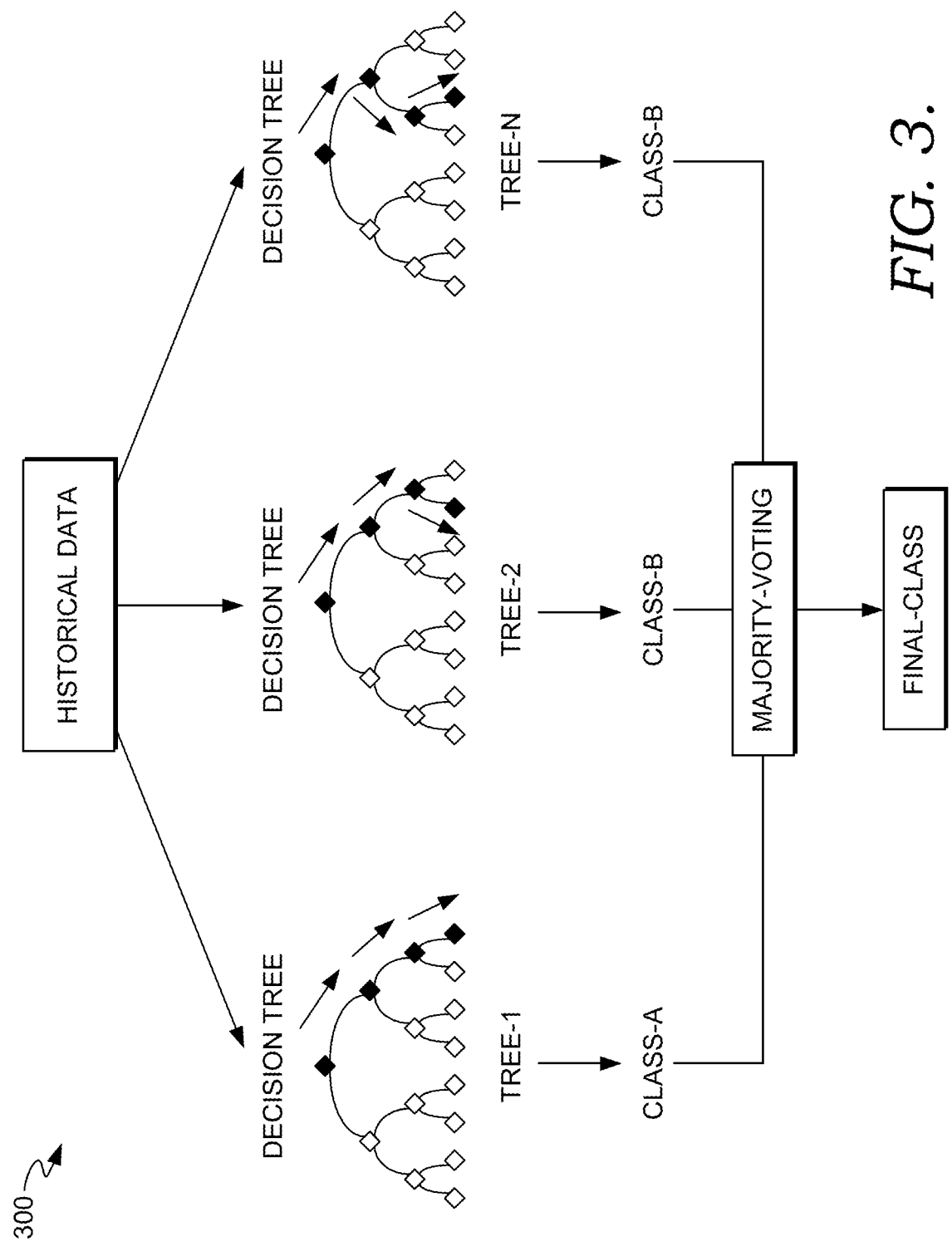
FIG. 3 is a chart illustrating an example of decision trees and corresponding classes for a model in accordance with aspect(s) of the present disclosure.

The historical data can be used to train the model using an ensemble type of learning. In some aspects, the model comprises a multi-class Random Forest ensemble algorithm, which uses ensemble learning for classification. In such an example, the Random Forest ensemble algorithm uses the historical data to build a model having a plurality of decision trees, where each decision tree is treated as its own distinct class in the model, as shown in the example of FIG. 3. Later, when the model makes a prediction, a selected text block template corresponds to one of the classes as represented by a decision tree.

When training the model, one or more algorithms may be used in combination and further, may be used in particular sequences, in order to produce a model that produces more accurate predictions than would result when trained without such a combination. For example, a multi-class Random Forest algorithm can comprise multiple algorithms and layers of algorithms. To train the model, the historical data acts as a training set of data that is split into a plurality of data sets or "samples" with a bootstrapping method, wherein algorithmic bootstrapping performs a random sampling of the historical data that includes random replacements during sampling. By using random replacements, the samples/data sets that are generated do not reflect that data has already been included in another data set (i.e., subsequent selections from the historical data during sampling are wholly independent from prior selections such that historical data can be reused and included in multiple data sets/samples). The plurality of data sets are then utilized to create a plurality of decision trees, where each leaf in each decision tree is given equal weight within the model. Each decision tree is assigned its own unique class, via an algorithmic aggregation technique (the combination of algorithmic bootstrapping followed by algorithmic aggregation can be referred to as "bagging" technique). Each class represents the model that has been formed by building a decision tree from the training set of data (i.e., the historical data), such that many models may thus be constructed from the same training set of data. The set of classes together form an ensemble classifier that represents all the models thus constructed, also referred to as a "combined classifier". The Random Forest includes the ensemble classifier (i.e., the aggregation of the decision tree classes, with various decisions combined using majority voting of the equal-weighted leaves in each decision tree). In this manner, the model is built and trained.

Further, in some aspects, the model is trained via algorithm(s) discussed above while enforcing one or more specifications or limits, referred to herein as "hyperparameter(s)." Hyperparameters can be enforced as constraints when training the model. In other words, the hyperparameters limit and/or control the algorithm(s) in a manner that optimizes the training of the model and, subsequently, improves the performance of the model in making predictions, as discussed hereinafter. In various aspects, the hyperparameters minimize the false positives produced by the trained model (i.e., improved "precision") and minimize the false negatives produced by the trained model (i.e., improved "recall"). Any quantity or type of hyperparameter may be used when training. For example, a single hyperparameter may be used. In another example, ten distinct hyperparameters may be used.

As shown in examples of Table 2 (below), a hyperparameter "Max-Depth" can be defined with the value "7" such that, when training the model, each of the decision trees is constructed via the algorithm(s) to have seven or fewer levels, but not more. In another example, a hyperparameter "N_estimators" can be defined with the value "55" such that, when training the model, a total number of decision trees that are allowed to be built can be predefined by that value (or defined by a value range). As shown in Table 2 (below), other hyperparameters can be used to control how the decision trees are built, including when a leaf node can be added and how to determine a best split in the decision tree. In various aspects, one or more hyperparameters, in any combination, may be predefined and used to control the model that is trained. The hyperparameters can be selected in order to produce an Area Under the Curve ("AUC") score, and an F1 score and a micro-averaged F1 score that are both as close as possible to the value of "1." Generally, the AUC score is a quantitative metric that represents the quality of a class, the F1 score represents a weighted average of the precision and recall of the trained model, and the micro-averaged F1 score represents the contribution of all the classes (the ensemble classifier) aggregated together.

TABLE 2

N_estimators: a quantity of trees in the forest
Max_depth: a maximum quantity of levels permitted in a decision tree
min_samples_split: a minimum quantity of samples required to split an internal node in a decision tree
min_samples_leaf: a minimum quantity of samples required to be at a leaf node in a decision tree
max_features: a maximum quantity of features to consider when searching for a best split After the training, the model predicts a best match for relevancy to an instance of an application based on user details and person details. For example, the trained model ingests clinician details, patient details, and/or diagnosis details that are associated with a clinical encounter for which documentation is to be entered into a particular instance of an application. Using the ingested data, the model identifies a text block template that is predicted to be the most relevant to the clinician details, patient details, and/or diagnosis details that are associated with that clinical encounter for which documentation is to be entered into that particular instance of the application. As such, the best match is also predicted to be a most applicable text block to the present instance of the application. The model automatically pre-populates the text input block within that instance of the application with the selected text block template, for example, when the text input box is presented within the graphical user interface to a user of the application. As such, the user can initiate an instance of the application to indicate that some electronic documentation is to be entered, and in response, the model is triggered to automatically ingest data, predict a most relevant text block template, and auto-populate the selected text block template into the application for automatic and immediate display within a text input block of the graphical user interface. In other words, when a clinician initiates a function to enter a clinical note or launches a clinical note documentation function of the application, the model is triggered to seamlessly predict and auto-populate that clinical note with the most relevant text block template in a manner that is automatic, seamless, and does not require user input. For example, FIG. 4 illustrates an example of a GUI 400 that has been auto-populated with a model-selected text block template.

When the user determines that the pre-populated text block template is relevant for his or her purposes, in that instance, for electronic documentation, the user may proceed to enter information, such as PII, and save the final document as, for example, a clinical note. When the user determines that the pre-populated text block template is not relevant or applicable (or could be manually made more relevant/applicable) and modifies the text in the pre-populated text block template, the user may provide an indication to store the modified version of text block template. The modified version of the pre-populated text block template may then be used to retrain the model.

Having provided an overview of various aspects of the present disclosure, it should be understood that the discussion of the system(s), method(s), and/or device(s) hereinafter can incorporate, leverage, or employ any or all of the details of the aspects described hereinabove.

Referring to FIG. 1, a system 100 is shown. The system 100 includes a database that stores historical data, such as a database 102 that stores an index 104 of classes and their associated text block templates. Further, the index 104 can store information specifying whether particular combinations of provider details, patient details, and diagnosis details are associated with each specific text block template. The system 100 further includes a model 106, such as a machine learning non-linear classification model into which hyperparameter(s) 108 can be input to tune machine training. The system 100 includes an application 110 for presenting a graphical user interface (GUI), wherein the GUI is configured to receive and/or capture user input and/or user feedback 112. The application 110 also presents predictive output from the model 106 via the GUI, as discussed below.

Generally, the machine learning non-linear classification model 106 (hereinafter referred to as "the model 106") is configured to receive historical data that includes a plurality of templates from the database 102. The model 106 can designate each template in the plurality of templates as a class and can assign a unique class identifier to each class designated for each template in the plurality of templates. Further, the model 106 can generate a plurality of decision trees using a constraint defined by a hyperparameter 108 that is predefined, such that each decision tree is associated with a class using a corresponding template. To this end, the model 106 is considered as trained using the historical data. The model 106, as trained, can make predictions on which text block templates to provide to an instance of an application, such as the application 110.

The model 106 can receive an indication that an instance of the application is instantiated, for example, from the application 110. Additionally, or concurrently with the initiation indication, the model 106 can receive test data from the application 110. The test data may include, as specific to that one instance of the application, a particular provider identifier associated with a clinical encounter, a patient identifier for one patient that is associated with the clinical encounter, and a diagnosis that is associated with one patient of the clinical encounter.

The model 106 ingests the test data. The model 106 then identifies a first decision tree from the plurality of decision trees that is a best match to the test data for a plurality of classes. Each decision tree in the plurality of decision trees corresponds to one class in the plurality of classes and each class in the plurality of classes corresponds to one template of the plurality of templates in the historical data, as described above. The model 106 identifies a first class that corresponds to the first decision tree, where the first class is associated with the unique class identifier that is used to distinguish the class from other classes. The model 106 further uses the unique class identifier that corresponds to the first class to retrieve a particular text block template that corresponds to the first class to be auto-populated. The text block template can be retrieved from the index 104. The model 106, together with the application 110, auto-populates the particular text block template into a free text input box within the application 110 for presentation in the GUI.

Having described the system 100 and components thereof, it will be understood by those of ordinary skill in the art that the system 100 is but one example of a suitable system and is not intended to limit the scope of use or functionality of the present disclosure. Similarly, the system 100 should not be interpreted as imputing any dependency and/or any requirements with regards to each component and combination(s) of components illustrated in FIG. 1. It will be appreciated by those of ordinary skill in the art, that the location of components illustrated in FIG. 1 is an example, as other methods, hardware, software, components, and devices for establishing a communication link between the components illustrated in FIG. 1, may be utilized in implementations of the present disclosure. It will be understood to those of ordinary skill in the art that the components may be connected in various manner, such as hardwired or wireless, and may use intermediary components that have been omitted or not included in FIG. 1 for simplicity and the sake of brevity. As such, the absence of components from FIG. 1 should not be interpreted as limiting the present disclosure to exclude additional components and combination(s) of components. Moreover, although components are represented in FIG. 1 as singular components, it will be appreciated that some embodiments of the present disclosure may include a plurality of devices and/or components.

Figure 2:
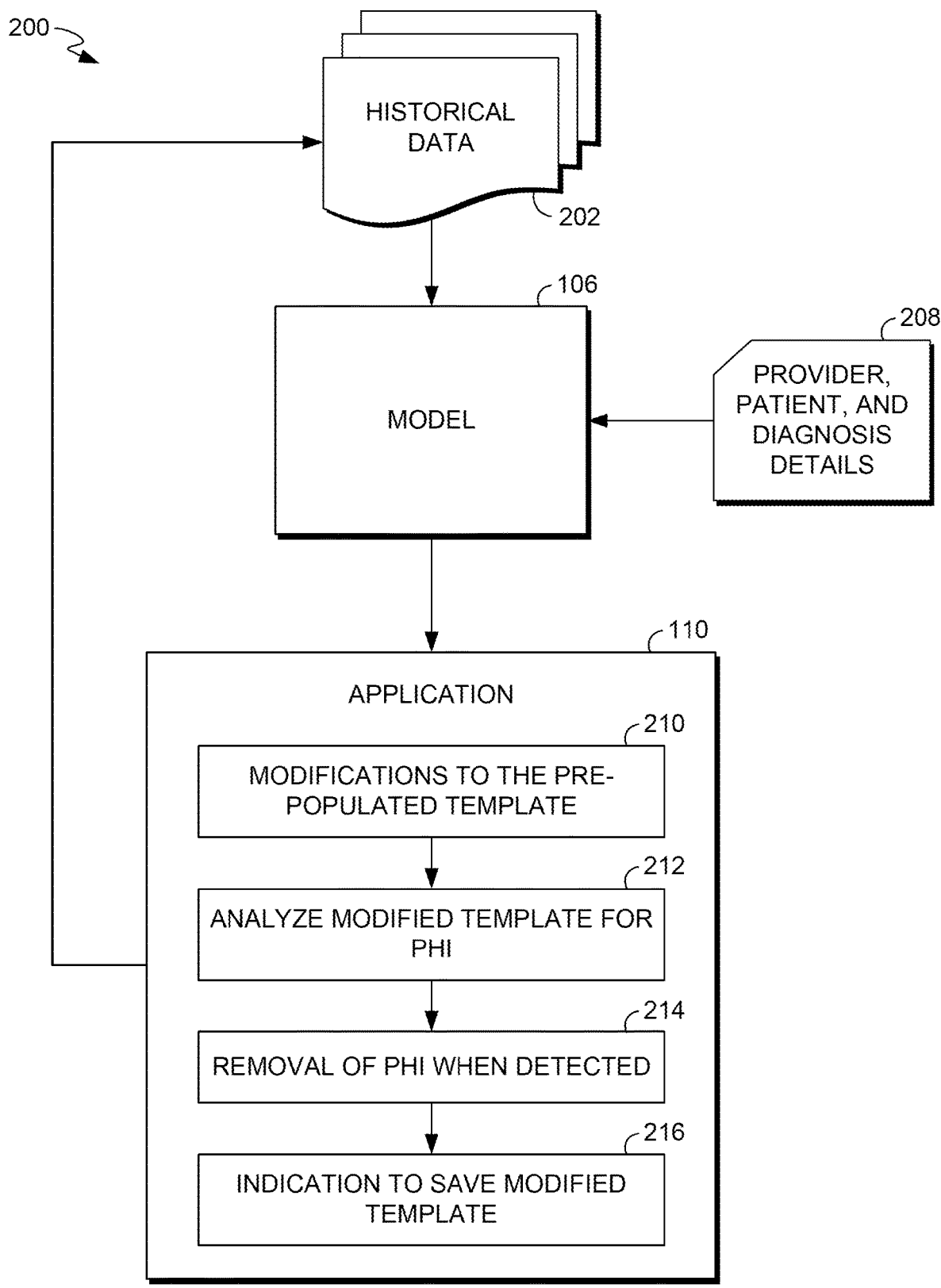
FIG. 2 is a block diagram of an example system and operations in accordance with aspect(s) of the present disclosure.

Continuing, FIG. 2 provides a flow diagram of a system 200 and steps thereof. In FIG. 2, historical data 202 is ingested by the model 106 and used to automatically train the model 106, as previously described. Subsequent to training, provider details, patient details, and diagnosis details 208 for an instance of an application 206 are ingested by the model 204, as discussed above. The model 106 outputs a prediction as a particular text block template to an application 206. The particular text block template is auto-populated into a free text input box within the GUI of the application 206. In FIG. 2, subsequent to auto-populating the particular text block template, a user can provide input or indications that are, or that make, modification(s) to the pre-populated template 210. The system 200 can analyze the modification(s) that are made to the pre-populated template, shown at 212. When the modifications are detected, the system 200 can also remove any personal health information (PHI)/personal identifying identification (represented by block 214). When the modified version of the template is free of PHI/PII (either by scrubbing or absence), the system 200 receives an indication to store (i.e., "save") the modified version of the template (represented by block 216) such as, the modification(s) to the pre-populated template).

Figure 5:
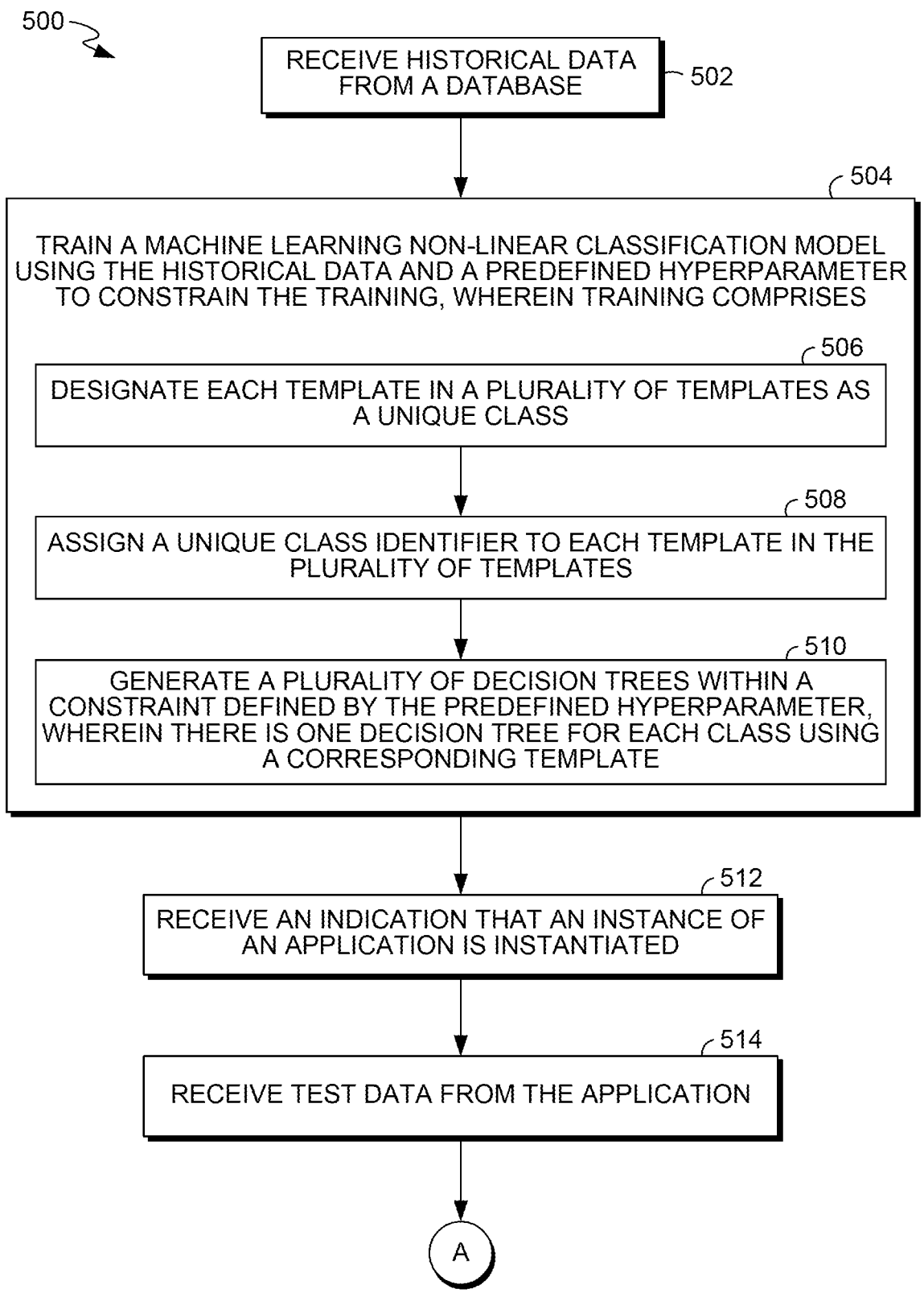
FIG. 5 is a flowchart of an example method in accordance with aspect(s) of the present disclosure.
Figure 5:
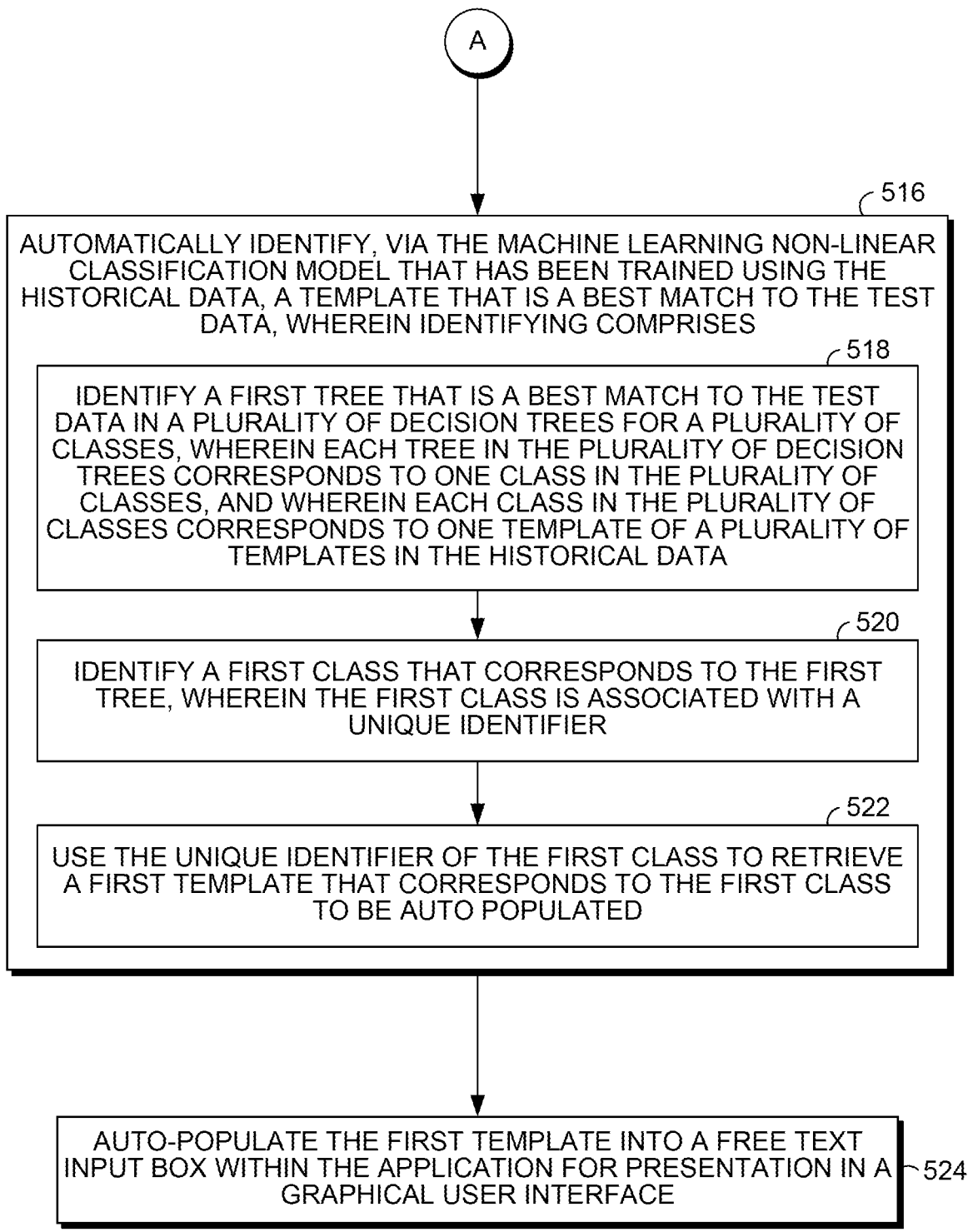

Referring to FIG. 5, a method 500 is provided for model-selected text block template auto-population within an application, such as the application 110 or 206. In some embodiments, the method 500 can be a computer-implemented method. In one embodiment, one or more non-transitory computer-readable storage media having computer-executable instructions or computer-readable program code portions embodied thereon, for execution via one or more processors, can be used to implement and/or perform the method 500. For example, computer-readable instructions or computer-readable program code portions can specify the performance of the method 500, can specify a sequence of steps of the method 500, and/or can identify particular component(s) of software and/or hardware for performing one or more of the steps of the method 500. The computer-readable instructions or computer-readable program code portions can correspond to an application and/or an application programming interface (API). In one embodiment, the application or the API can implement and/or perform the method 500. As discussed below, the method 500 can be performed using software, hardware, component(s), and/or device(s) illustrated in FIG. 1 and/or FIG. 2. In addition, the method 500 is described in conjunction with FIG. 1 and FIG. 2.

At block 502, historical data is received from a database, such as the database 102. The historical data can include a plurality of templates. At block 504, a machine learning non-linear classification model, such as the model 106, is trained using the historical data and a predefined hyperparameter, such as the hyperparameter 108, to constrain the training. In some aspects of the present disclosure, the machine learning non-linear classification model is a Random Forest Model. When training the model, each template in a plurality of templates is designated as a class, as shown at block 506. For example, the model can determine a plurality of classes, wherein each class in the plurality of classes corresponds to one template in the plurality of templates. When training the model, as shown at block 508, a unique class identifier is assigned to each class designated for each template in the plurality of templates. Thus, each class has its own identifier for distinguishing between the classes. During the model training, a plurality of decision trees are generated that are within the constraint defined by the predefined hyperparameter, such that there is one decision tree for each class using a corresponding template, as shown at block 510. Accordingly, a plurality of decision trees are created for the plurality of classes, wherein each class in the plurality of classes corresponds to one decision tree in the plurality of decision trees (1:1 ratio of class:tree).

At block 512, an indication is received that an instance of the application is instantiated. At block 514, test data is received from the application. The test data can include, for example, provider details, patient details, and/or diagnosis details for the instance of the application that is instantiated. The indication that an application instance is initiated and/or the test data receipt can automatically cause the model to take next step to identify and provide a template. In other words, in response to the instantiation of the application and/or receipt of the test data, the model ingests the test data and is triggered to predictively determine whether the template in the historical data is a "match" to the test data.

As such, at block 516, the model that has been trained using the historical data automatically identifies a particular template that is a best match to the test data. A first decision tree is identified that is the best match to the test data in the plurality of decision trees for a plurality of classes, shown at block 518, wherein each decision tree in the plurality of decision trees corresponds to one class in the plurality of classes, and wherein each class in the plurality of classes corresponds to one template of the plurality of templates in the historical data. The first decision tree is identified as being the best match to the provider details, patient details, and diagnosis details for the instance of the application that is instantiated, in various aspects, relative to the other decision trees generated by the model during training. Further, at block 520, the model identifies a first class that corresponds to the first decision tree, wherein the first class is associated with a unique class identifier. Using the unique class identifier of the first class at block 522, the particular template that corresponds to the first class to be auto-populated is retrieved. As such, based on the unique class identifier for the particular first class, one particular template that corresponds to the particular class is predicted, by the model, to be the best match to the test data. At block 524, the particular template is auto-populated into a free text input box within the application for presentation in the GUI.

In further aspects, the model continues to learn with retraining based on the user's input and/or feedback in the form of modification(s) made to the pre-populated template, herein referred to as a modified version of the template, that was auto-populated into the application, such as the application 110. In one aspect, via the application, an indication is received for a modification made to the particular template that was auto-populated into the free text input box within the application. The system, such as the system 100, 200, determines whether the modification made to the particular template includes PHI. When PHI is determined to be absent from the modification made to the particular template, the particular template, as modified, is stored in a data base. When the modification made to the particular template includes PHI, a notification is communicated to the application for presentation in the GUI, wherein the notification identifies the presence of the PHI and/or identifies the particular PHI.

The modified version of the template can be stored, in an aspects, by locating the particular template stored in the database, such as the database 102, based on/using the unique class identifier for the first class that corresponds to the particular template (pre-modification). In other words, the system, such as the system 100, 200, is aware of the particular template that was provided prior. The system may further overwrite the particular (unmodified) template existing in the database with the particular modified version of that template, obtained from the application, such as the application 110. The modified version of the template is stored in association with the unique class identifier for the first class, thus replacing the prior version of the template for the first class. In this manner, the modified template can serve as the historical data for retaining the model. In aspects, the model is periodically retrained using the historical data, which includes the particular modified version of the template, as well as the predefined hyperparameter to constrain the training.

Figure 6:
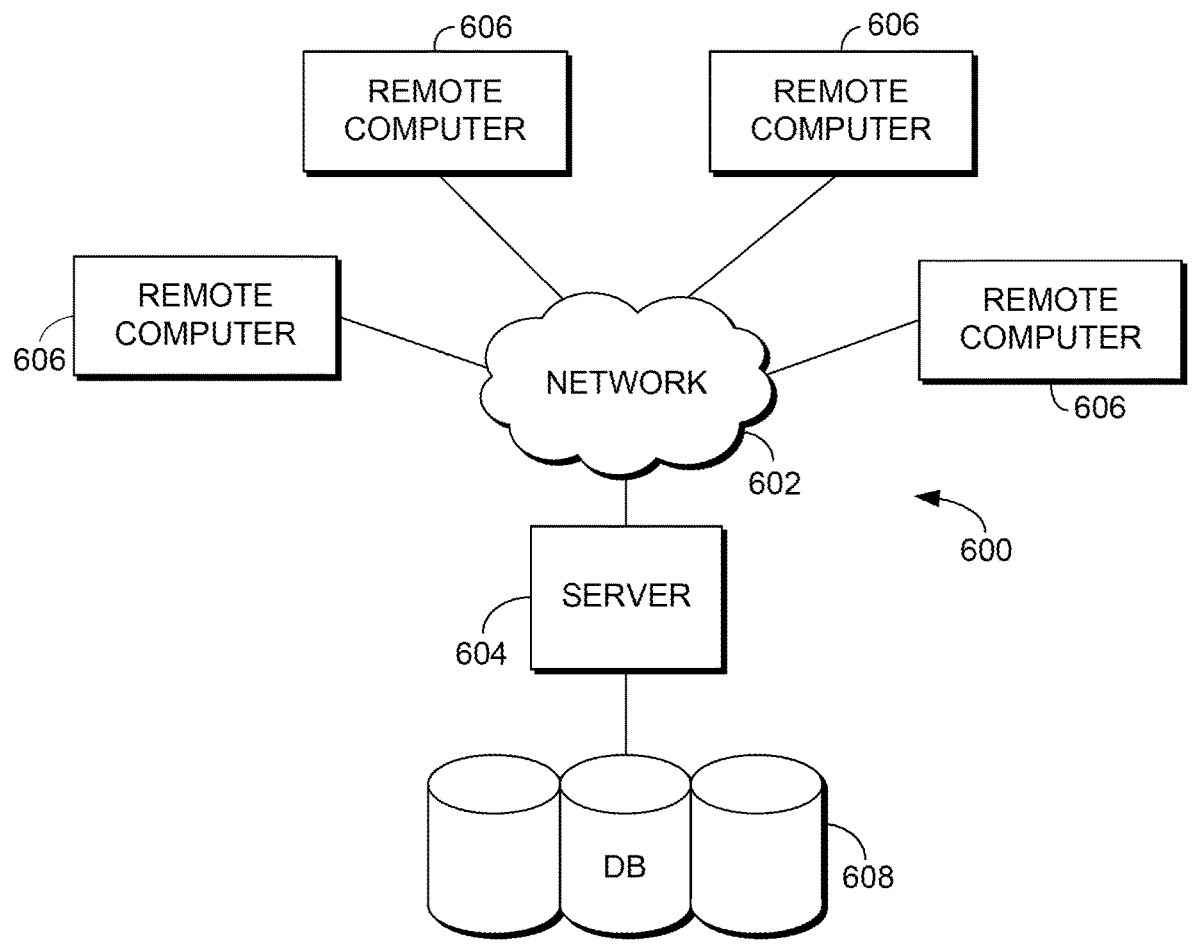
FIG. 6 is a block diagram of an example computing environment suitable to implement aspect(s) of the present disclosure.

Referring to FIG. 6, an example of a computing environment 600 is illustrated, in accordance with aspects of this disclosure. It will be understood by those of ordinary skill in the art that the computing environment 600 is just one example of a suitable computing environment and is not intended to limit the scope of use or functionality of the present disclosure. Similarly, the computing environment 600 should not be interpreted as imputing any dependency and/or any requirements with regard to each component and combination(s) of components illustrated in FIG. 6. It will be appreciated by those having ordinary skill in the art that the connections illustrated in FIG. 6 are also exemplary as other methods, hardware, software, and devices for establishing a communications link between the components, devices, systems, and entities, as shown in FIG. 6, may be utilized in implementation of the present disclosure. Although the connections are depicted using one or more solid lines, it will be understood by those having ordinary skill in the art that the exemplary connections of FIG. 6 may be hardwired or wireless and may use intermediary components that have been omitted or not included in FIG. 6 for sake of brevity. As such, the absence of components from FIG. 6 should not be interpreted as limiting the present disclosure to exclude additional components and combination(s) of components. Moreover, although devices and components are represented in FIG. 6 as singular devices and components, it will be appreciated that, in some embodiments, the computing environment 600 may include a plurality of the devices and components such that FIG. 6 should not be considered as limiting the number of a device or component.

Continuing, the computing environment 600 of FIG. 6 is illustrated as being a distributed environment where components and devices may be remote from one another and may be configured to perform separate tasks. The components and devices may communicate with one another and may be linked to each other using a network 602. The network 602 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short-range wireless network, a Wireless Metropolitan Area Network (WMAN), a Bluetooth® capable network, a fiber optic network, or a combination thereof. The network 602, generally, provides the components and devices access to the internet and web-based applications.

The computing environment 600 comprises a computing device 604, embodied, for example, as a server in the present disclosure). Although illustrated as one component in FIG. 6, the present disclosure may utilize a plurality of local servers and/or remote servers in the computing environment 600. The computing device 604 may include components, such as a processing unit, internal system memory, and a suitable system bus, for coupling with various other components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The computing device 604 may include or may have access to computer-readable media. The computer-readable media can be any available media that may be accessed by the computing device 604, and includes volatile and nonvolatile media, as well as removable and non-removable media. By way of example, and not limitation, computer-readable media may include computer storage media and communication media. The computer storage media may include, without limitation, volatile and nonvolatile media, as well as removable and non-removable media, implemented in any method or technology for storage of information, such as computer-readable instructions, data structures, program modules, or other data. In this regard, computer storage media may include, for example, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 604. The computer storage media does not comprise signals per se.

Communication media typically includes or embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, the communication media includes wired media, such as a wired network or direct-wired connection, and wireless media, such as acoustic, radio frequency (RF), infrared, and other wireless media. Combinations of any of the above may also be included within the scope of computer-readable media.

In some embodiments, the computing device 604 uses logical connections to communicate with one or more remote computing devices, such as remote computer(s) 606 (shown in FIG. 6) within the computing environment 600. In embodiments where the network 602 includes a wireless network, the computing device 604 may employ a modem to establish communications with the internet, and the computing device 604 may connect to the internet using Wi-Fi or wireless access points, or the server, such as the computing device 604, may use a wireless network adapter to access the internet. The computing device 604 engages in two-way communication with any or all the components and devices illustrated in FIG. 6, using the network 602. Accordingly, the computing device 604 may send data to and receive data from the remote computer(s) 606 via the network 602.

Although illustrated as a single device, the remote computing devices, such as the remote computer(s) 606, may include multiple computing devices. In an embodiment having a distributed network, the remote computing devices may be located at one or more different geographic locations. In an embodiment where the remote computing devices includes a plurality of computing devices. For example, each of the plurality of computing devices may be located across various locations, such as in buildings located in a campus, medical and research facilities within a medical complex, offices, or "branches" of a banking/credit entity mobile devices that are wearable or carried by personnel or devices attached to vehicles or trackable items in a warehouse.

In some embodiments, the remote computing devices may be physically located in a medical setting, such as, for example, a laboratory, inpatient room, an outpatient room, a hospital, a medical vehicle, a veterinary environment, an ambulatory setting, a medical billing office, a financial or administrative office, hospital administration setting, an in-house medical care environment, and/or medical professionals' offices. By way of example, a medical professional may include physicians; medical specialists, such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computer(s) 606 may be physically located in a non-medical setting, such as a packing and shipping facility or may be deployed within a fleet of delivery vehicles or courier vehicles.

Furthermore, the computing environment 600 includes a data base 608. Although shown as a single component, the data base 608 ("DB"), may be implemented using multiple data bases that are communicatively coupled to one another, independent of the geographic or physical location of a memory device. Exemplary data bases may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data bases may also store data in the form of electronic records, for example, electronic medical records of patients, transaction records, billing records, task and workflow records, chronological event records, and the like.

Generally, the data base 608 includes physical memory that is configured to store information encoded in data. For example, the data base 608 may provide storage for computer-readable instructions, computer-executable instructions, data structures, data arrays, computer programs, applications, and other data that supports the functions and action to be undertaken using the computing environment 600 and components shown in exemplary FIG. 6.

In a computing environment, such as the computing environment 600, distributed components may be communicatively coupled via the network 602, program modules may be located in local and/or remote computer storage media including, for example only, memory storage devices. Embodiments of the present disclosure may be described in the context of computer-executable instructions, such as program modules, being executed by a computing device, such as the computing device 604. Program modules may include, but are not limited to, routines, programs, objects, components, and data structures that perform particular tasks or implement particular abstract data types. In some embodiments, the computing device 604 may access, retrieve, communicate, receive, and update information stored in the data base, such as the data base 608, including program modules. Accordingly, the computing device 604 may execute, using a processor, computer instructions stored in the data base 608 in order to perform embodiments described herein.

Although internal components of the devices in FIG. 6, such as the computing device 604, are not illustrated, those of ordinary skill in the art will appreciate that internal components and their interconnection are present in the devices of FIG. 6. Accordingly, additional details concerning the internal construction device are not further disclosed herein.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. A computerized method comprising:
   receiving historical clinical data from a database, wherein the historical clinical data comprises at least one of patient details, provider details, or diagnosis details pertaining to clinical encounters;
   training a plurality of decision trees according to a multi-class random forest ensemble algorithm using the historical clinical data, wherein the training yields a plurality of trained decision trees;
   receiving test clinical data, wherein the test clinical data comprises at least one of patient details, provider details, or diagnosis details pertaining to a particular clinical encounter;
   automatically causing the plurality of trained decision trees to identify a set of two or more classes, wherein each class of the two or more classes is identified as a match to the test data;
   determining a particular class, of the set of two or more classes, that is a best match to the test clinical data;
   determining a particular text box template corresponding to the particular class; and
   auto-populating the particular text box template into a clinical note free text input box of a computer graphical user interface.

2. The computerized method of claim 1, further comprising enforcing one or more predefined hyperparameters during the training of the plurality of decision trees, wherein each hyperparameter constrains at least one aspect of building the decision trees to improve predictive performance.

3. The computerized method of claim 1, further comprising periodically retraining the plurality of decision trees using newly obtained historical clinical data and/or user feedback to continuously refine a predictive accuracy of the multi-class random forest ensemble algorithm.

4. The computerized method of claim 1,
   further comprising receiving modifications to the auto-populated particular text box template from a user resulting in a modified text box template, and retraining the plurality of decision trees using data derived from the modified text box template.

5. The computerized method of claim 1, further comprising removing personally identifiable information (PII) or protected health information (PHI) from the historical clinical data prior to training the plurality of decision trees.

6. The computerized method of claim 1,
   wherein training the plurality of decision trees according to the multi-class random forest ensemble algorithm comprises performing bootstrap sampling with replacement on the historical clinical data to create multiple data subsets.

7. The computerized method of claim 1,
   wherein determining the particular class comprises performing a majority voting operation across leaf predictions of the plurality of trained decision trees.

8. The computerized method of claim 1, further comprising:
   assigning a unique class identifier to each trained decision tree, each unique class identifier corresponding to a particular text box template, thereby enabling retrieval of the particular text box template based on the identified best-matching class.

9. The computerized method of claim 1
   wherein receiving historical clinical data further comprises receiving a combination of patient details, provider details, and diagnosis details as input features for training the plurality of decision trees.

10. The computerized method of claim 1,
    wherein one or more predefined hyperparameters for constraining the training include at least one of: a maximum depth for each decision tree, a minimum number of samples required to split an internal node, a minimum number of samples required at a leaf node, or a maximum number of features considered when determining a best split.

11. The computerized method of claim 1,
    further comprising selecting one or more predefined hyperparameters to constrain the training based on a target performance metric selected from the group consisting of area under the curve (AUC), F1 score, and micro-averaged F1 score, thereby improving predictive performance of the trained plurality of decision trees.

12. The computerized method of claim 1,
    wherein auto-populating the particular text box template is triggered in near real-time upon receiving the test clinical data, thereby causing near immediate display of the particular text box template within the computer graphical user interface without additional user input.

13. One or more non-transitory computer-readable media having computer-executable instructions embodied thereon that, when executed, perform a method comprising:
    receiving historical data from a database;
    training a plurality of decision trees according to a multi-class random forest ensemble algorithm using the historical data and a predefined hyperparameter to constrain the training, wherein the training yields a plurality of trained decision trees;
    receiving test data from an application;
    automatically identifying, via the plurality of trained decision trees, a particular template that is a best match to the test data; and
    auto-populating the particular template into a free text input box within the application for presentation in a graphical user interface.

14. The one or more non-transitory computer-readable media of claim 13, the method further comprising:
    enforcing one or more predefined hyperparameters during the training of the plurality of decision trees, wherein each hyperparameter constrains at least one aspect of building the decision trees to improve predictive performance.

15. The one or more non-transitory computer-readable media of claim 13, the method further comprising:
    periodically retraining the plurality of decision trees using newly obtained historical clinical data and/or user feedback to continuously refine a predictive accuracy of the multi-class random forest ensemble algorithm.

16. The one or more non-transitory computer-readable media of claim 13, the method further comprising:
    receiving modifications to the auto-populated particular template from a user resulting in a modified template, and retraining the plurality of decision trees using data derived from the modified template.

17. The one or more non-transitory computer-readable media of
    claim 13, the method further comprising removing personally identifiable information (PII) or protected health information (PHI) from the historical data prior to training the plurality of decision trees.

18. The one or more non-transitory computer-readable media of
    claim 13, wherein training the plurality of decision trees according to the multi-class random forest ensemble algorithm comprises performing bootstrap sampling with replacement on the historical data to create multiple data subsets.

19. The one or more non-transitory computer-readable media of claim 13, wherein determining the particular template comprises performing a majority voting operation across leaf predictions of the plurality of trained decision trees.

20. A system comprising:
one or more computers having one or more hardware processors; and
instructions configured to cause the one or more computers to:
receive historical data from a database;
train a plurality of decision trees according to a multi-class random forest ensemble algorithm using a constraint defined by a predefined hyperparameter to yield a plurality of trained decision trees;
receive test data from an application;
automatically identify, using the plurality of trained decision trees, a particular template that is a best match to the test data; and
auto-populate the particular template into a free text input box within the application for presentation in a graphical user interface.

* * * * *